United States Patent [19]

Speckhart et al.

[11] Patent Number: 5,193,686
[45] Date of Patent: Mar. 16, 1993

[54] APPARATUS FOR LOADING ARTICLES

[75] Inventors: Bernard Speckhart, Short Hills; Paul M. Berson, Mountain Lakes; Garri Akopnik, Newark, all of N.J.

[73] Assignee: White Conveyors, Inc., Kenilworth, N.J.

[21] Appl. No.: 643,857

[22] Filed: Jan. 22, 1991

[51] Int. Cl.⁵ .............................................. B65G 29/00
[52] U.S. Cl. ...................................... 209/3.3; 209/937; 198/465.4
[58] Field of Search ............................. 209/3.3, 937; 198/465.4, 687.1, 468.6, 468.8, 486.1

[56] References Cited

U.S. PATENT DOCUMENTS

| | | | |
|---|---|---|---|
| 1,412,631 | 4/1922 | Righter. | |
| 1,861,600 | 6/1932 | Harrison. | |
| 1,998,109 | 4/1935 | Walter, Jr. | 211/1.5 |
| 2,449,669 | 9/1948 | Pohlers | 198/168 |
| 2,536,575 | 1/1951 | Seldin | 198/168 |
| 2,573,334 | 10/1951 | Hitz | 198/173 |
| 2,583,968 | 1/1952 | Rosseau | 263/6 |
| 2,645,186 | 7/1953 | Davis | 104/97 |
| 2,708,501 | 5/1955 | Boehm | 198/27 |
| 2,750,897 | 6/1956 | Davis | 104/96 |
| 2,751,091 | 6/1956 | Freeman | 214/11 |
| 2,846,049 | 8/1958 | Carlson | 198/130 |
| 2,861,676 | 11/1958 | Rasmussen et al. | 198/218 |
| 2,868,354 | 1/1959 | Harrison | 198/177 |
| 2,899,072 | 8/1959 | Weiss | 211/1.5 |
| 2,916,132 | 12/1959 | Leiser | 198/21 |
| 2,918,164 | 12/1959 | Austin et al. | 198/177 |
| 2,947,407 | 8/1960 | Wood | 198/66 |
| 2,998,136 | 8/1961 | Gerisch | 209/937 X |
| 3,017,025 | 1/1962 | Stephen | 209/81 |
| 3,090,481 | 5/1963 | Biel et al. | 198/221 |
| 3,113,659 | 12/1963 | Oda et al. | 198/25 |
| 3,124,236 | 3/1964 | Gerisch | 198/169 |

(List continued on next page.)

FOREIGN PATENT DOCUMENTS

| | | | |
|---|---|---|---|
| 334127 | 7/1933 | Canada | 203/17 |
| 690778 | 7/1964 | Canada | 186/11 |
| 726529 | 1/1966 | Canada | 198/22 |
| 1018472 | 10/1977 | Canada | 203/18 |
| 1018931 | 10/1977 | Canada | 203/18 |
| 1140139 | 11/1962 | Fed. Rep. of Germany. | |

OTHER PUBLICATIONS

Master-Veyor brochure, published by Speed Check Conveyor Co. Inc., Decatutr, Ga., pp. 1-4.
Sorting Carousel brochure, published by Dunnewolt U.S.A. Inc., Dallas, Tex., pp. 1-4.
My-T-Veyor brochure Model No. 830, Published by My-T-Veyor, Oxford, Mich., pp. 1-3.
Sort-O-Veyor brochure, published by Speed Check Conveyor Inc., Decatur, Ga., pp. 1-4.
Quick Assembly brochure, published by Natmar Inc., Cincinnati, Ohio, pp. 1-2.
Controlling Hospital Garments, Wim Giezeman, Textile Rental, Jun. 1982, pp. 34-38.

Primary Examiner—Robert P. Olszewski
Assistant Examiner—Cheryl L. Gastineau
Attorney, Agent, or Firm—Kenyon & Kenyon

[57] ABSTRACT

An apparatus loads hooked members supporting articles onto a conveyor. The conveyor has a plurality of latches, wherein each latch is adapted to receive and support a respective hooked member. A loading member is adapted to successively receive the hooked members and, in turn, load the hooked members one after another into the latches. The free end of a piston is coupled to the loading member and is operated to drive the loading member between a first position for receiving a hooked member, and a second position for loading the hooked member into a latch. A scanning device is adapted to scan coded labels on articles supported on the hooked members and, in turn, generate output signals indicative of the identifying information coded on the labels. A computer is coupled to the scanning device and to the conveyor, and is adapted to store the output signals and, in turn, sort the articles loaded onto the conveyor.

38 Claims, 5 Drawing Sheets

U.S. PATENT DOCUMENTS

| | | | |
|---|---|---|---|
| 3,151,730 | 10/1964 | Buenten | 198/38 |
| 3,152,682 | 10/1964 | Rutkovsky et al. | 198/38 |
| 3,164,245 | 1/1965 | Juengel | 198/465.4 X |
| 3,184,042 | 5/1965 | Rutkovsky et al. | 198/177 |
| 3,194,383 | 7/1965 | Kuwertz | 198/38 |
| 3,247,952 | 4/1966 | Kozlosky | 198/173 |
| 3,403,767 | 10/1968 | Gerisch | 198/20 |
| 3,415,352 | 12/1968 | Gerisch | 198/38 |
| 3,422,950 | 1/1969 | Bachmann | 198/177 |
| 3,454,148 | 7/1969 | Harrison | 198/28 |
| 3,469,667 | 9/1969 | Gerisch | 193/40 |
| 3,511,359 | 5/1970 | Gerisch | 198/126 |
| 3,557,935 | 1/1971 | Gerisch | 198/38 |
| 3,580,378 | 5/1971 | Pedersen | 198/465.4 |
| 3,581,887 | 6/1971 | Radutsky et al. | 209/73 |
| 3,622,000 | 11/1971 | McClenny | 209/121 |
| 3,786,911 | 1/1974 | Milazzo | 198/219 |
| 3,799,318 | 3/1974 | Dekoekkoek | 198/465.4 X |
| 3,917,112 | 11/1975 | Willis et al. | 221/1 |
| 3,942,340 | 3/1976 | Kirkby | 68/3 R |
| 3,961,699 | 6/1976 | Hirsch | 198/465.4 X |
| 4,018,327 | 4/1977 | Goodman et al. | 198/723 |
| 4,022,338 | 5/1977 | Laursen | 198/465.4 X |
| 4,027,598 | 6/1977 | Swilley | 104/162 |
| 4,036,365 | 7/1977 | Rosenfeld | 209/73 |
| 4,239,435 | 12/1980 | Weiss et al. | 209/937 X |
| 4,303,503 | 12/1981 | de Mimerand et al. | 209/3.3 |
| 4,903,819 | 2/1990 | Heinold et al. | 198/465.4 |
| 4,907,699 | 3/1990 | Butcher et al. | 209/3.3 |
| 4,943,198 | 7/1990 | McCabe | 414/13 |
| 4,991,719 | 2/1991 | Butcher et al. | 209/3.3 |

APPARATUS FOR LOADING ARTICLES

FIELD OF THE INVENTION

The present invention relates to apparatus for conveying articles and, in particular, to apparatus for conveying and loading articles supported on hooked members onto conveyors.

BACKGROUND INFORMATION

Apparatus for conveying and loading articles and, in particular, articles supported on hooked members, are used in various industries. For example, articles conveyed in an assembly line are frequently supported on hooked members. The hooked members are carried by a conveyor so that the articles can be used or worked on in the assembly line.

In laundry and dry cleaning facilities, the hooked members are typically garment hangers. The cleaned garments (typically several hundred) are placed on hangers and loaded onto a sorting conveyor, wherein several drop-off stations are located at various points along the sorting conveyor for depositing the cleaned garments.

In order to sort the garments, they are moved by the sorting conveyor and unloaded in predetermined drop-off stations. The sorted garments located in one or more drop-off stations are then loaded into trucks for delivery to the customers.

In order to sort the garments on the sorting conveyor, each garment must be identified and therefore typically has a label displaying identifying information. Thus, prior to loading the garments onto the sorting conveyor, an operator may read the label for each respective garment and, in turn, enter the identifying data into a computer. The operator then loads each garment by hand onto the sorting conveyor.

The operator's job of reading the labels on each of the garments and entering the identifying data into a computer is tedious. As a result, operators can frequently make mistakes either in reading the labels on the garments, or entering the data from the labels into the computer. Once the erroneous data is entered into the computer, the garments cannot be properly sorted.

The job of loading the garments one after another onto the sorting conveyor is also tedious. Operators can therefore frequently make mistakes, such as placing the garments in the wrong order on the conveyor, or loading more than one hanger into a single latch on the conveyor. Such mistakes can prevent the garments from being properly sorted.

SUMMARY OF THE INVENTION

The present invention is directed to an apparatus for loading hooked members onto a conveyor. The apparatus comprises a load member supported adjacent to the conveyor and adapted to receive a hooked member when located in a first position. The load member is further adapted to be driven into a second position to load the hooked member onto the conveyor. The apparatus preferably further comprises a drive unit coupled to the load member and adapted to drive the load member between the first and second positions.

An apparatus of the present invention further comprises a control unit coupled to the drive unit to control the operation of the drive unit. A first sensor is coupled to the control unit and adapted to sense the presence of the load member in the first position and, in turn, transmit an output signal indicative thereof to the control unit.

A second sensor is coupled to the control unit and adapted to sense the presence of the load member without a hooked member and, in turn, transmit an output signal indicative thereof to the control unit. The control unit is responsive to the output signals from the first and second sensors to control the drive unit to drive the load member from the first position into the second position and, in turn, load a respective hooked member onto the conveyor.

An apparatus of the present invention further comprises a third sensor coupled to the control unit. The third sensor is adapted to sense the presence of the load member in the second position and to transmit an output signal indicative thereof to the control unit. The control unit is responsive to the output signal to control the drive unit to drive the load member into the first position.

An apparatus of the present invention further comprises a fourth sensor coupled to the control unit and adapted to transmit signals to the control unit indicative of the position of the conveyor. The control unit is in turn coupled to the conveyor and responsive to the signals to control the movement of the conveyor based thereon.

An apparatus of the present invention further comprises a scanning device coupled to the control unit. The scanning device is adapted to decode coded information on the articles prior to being delivered to the load member. The scanning device is in turn adapted to transmit signals to the control unit indicative of the information coded on each article. A loading conveyor is preferably supported adjacent to the scanning device and adapted to successively deliver the hooked members to the load member. The scanning device is in turn adapted to decode the coded information on the articles prior to delivery to the load member.

One advantage of the apparatus of the present invention, is that the load member is adapted to automatically load hooked members, such as hangers supporting garments, one after another onto a conveyor. As a result, the tedious job previously performed by operators of manually loading garments one after another onto the conveyor is no longer required.

Another advantage of the apparatus of the present invention, is that a scanning device is used to automatically decode coded information on each respective article, such as a garment, prior to loading the garment onto the conveyor. As a result, the identifying information for the articles can be rapidly and automatically obtained and stored in a control unit, and the articles can, in turn, be automatically loaded onto the conveyor. Accordingly, the tedious job previously performed by operators of reading and entering the identifying information for each garment into a computer and, in turn, loading each garment by hand onto a conveyor is no longer required.

Other advantages of the apparatus of the present invention will become apparent in view of the following detailed description and drawings taken in connection therewith.

DETAILED DESCRIPTION

Figure 1:
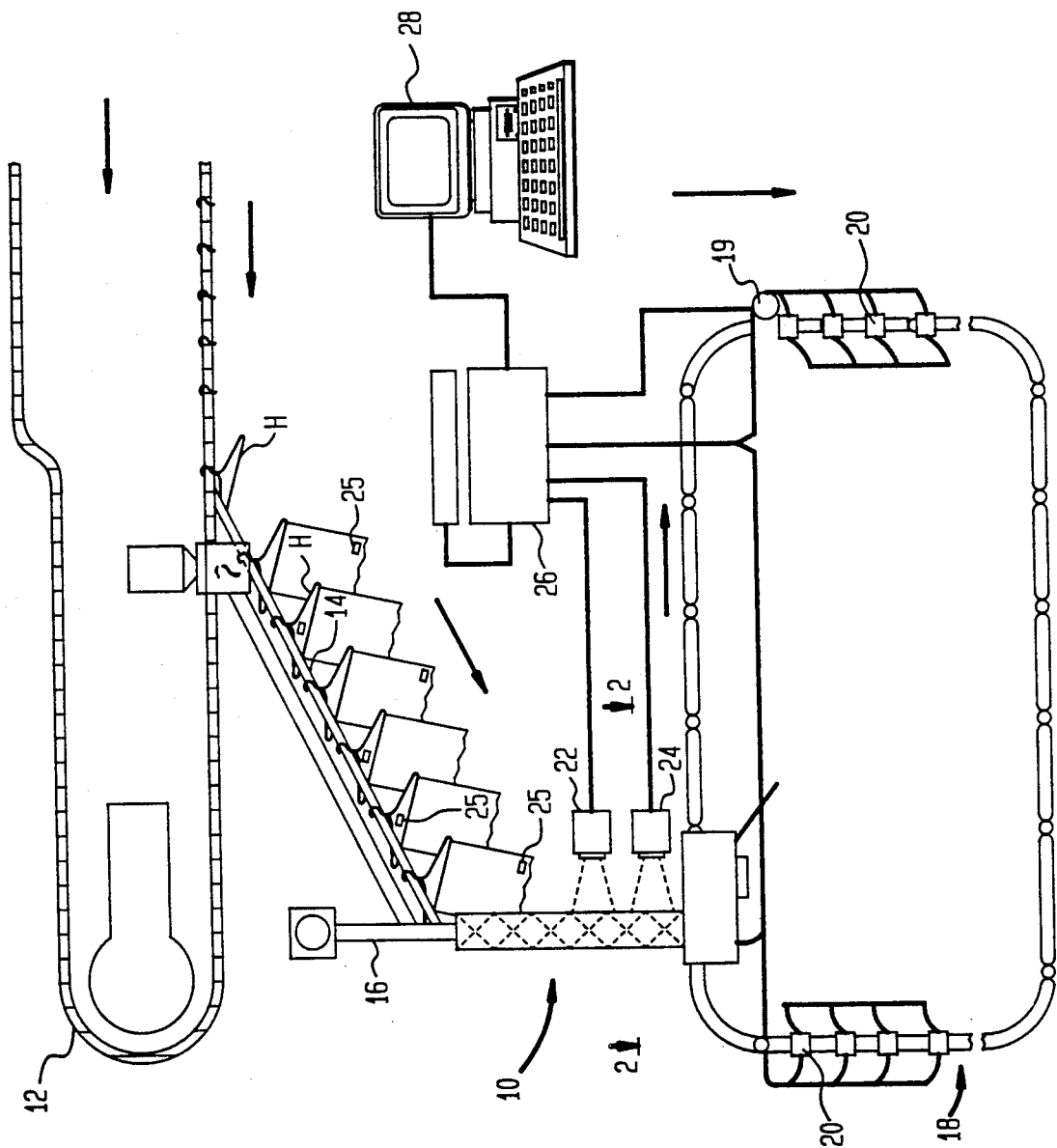
FIG. 1 is a top plan view of an apparatus embodying the present invention for loading articles supported on hooked members onto a conveyor.

In FIG. 1, an apparatus embodying the present invention for loading articles supported on hooked members onto a conveyor, is indicated generally by the reference numeral 10. In the embodiment of the present invention illustrated, the apparatus 10 is adapted to load garments supported on hangers H onto a sorting conveyor, used typically in laundry and dry cleaning facilities. It should be pointed out, however, that the apparatus 10 can equally be adapted for loading numerous other types of hooked members and articles in other types of facilities. The garments originate from a transporting conveyor 12, which may be located at a higher level than the other components. The hangers H are therefore conveyed downwardly from the transporting conveyor 12 by a first conveyor 14.

The first conveyor 14 is adapted to convey the hangers H from one elevation to another and, in turn, onto a second conveyor 16. The second conveyor 16 is preferably the same as the conveyor shown and described in co-pending U.S. patent application Ser. No. 07/643,776 entitled "Apparatus For Conveying", filed on even date herewith, which is assigned to the same assignee as is the present invention, and is hereby expressly incorporated by reference herein. The second conveyor 16 feeds the hangers H one after another to the apparatus 10 which, in turn, loads the hangers H onto a sorting conveyor 18.

The sorting conveyor 18 can be a type known to those of ordinary skill in the art, such as the sorting conveyor shown and described in U.S. Pat. No. 4,239,435, issued Dec. 16, 1980 to Weiss et al., and which is assigned to the same assignee as is the present invention, and is hereby expressly incorporated by reference herein. The apparatus 10 loads the hangers H one at a time onto the sorting conveyor 18. Once all of the hangers H are loaded onto the sorting conveyor 18, the conveyor is driven by a motor 19 to sort the hangers H into respective drop-off stations 20.

Each drop-off station 20 is preferably the same as that shown and described in co-pending U.S. patent application Ser. No. 07/643,435 entitled "Apparatus For Unloading Articles", filed on even date herewith, which is assigned to the same assignee as is the present invention, and is hereby expressly incorporated by reference herein. The garments supported on the hangers H are sorted in a predetermined order, for example, so that all of the garments for a particular customer are located in the same drop-off station 20, or the garments for the customers forming a particular delivery driver's route are located and sorted separately for each customer within a respective drop-off station.

The apparatus 10 includes a first scanner 22 and a second scanner 24, as shown in FIG. 1. The scanners 22 and 24 are bar code scanners of a type known to those of ordinary skill in the art, such as model number MS-1280, manufactured by Microscan Systems Incorporated, of Tukwila, Wash. The bar code scanners 22 and 24, however, are purely exemplary, and other types of scanning means can equally be used, such as dot code scanners and other types of optical code scanners.

Each of the garments supported on the hangers H includes a coded label 25 of a type known to those of ordinary skill in the art. Identifying information is coded onto each label 25 so that the respective garment can be identified and, in turn, sorted once it is loaded onto the sorting conveyor 18, as is described further below. If the garment has a collar, such as a shirt or jacket, then the label 25 is preferably attached to an interior surface of the collar. If, however, the garment has a waistline, such as a pair of trousers, then the label 25 is preferably attached to an exterior surface of the waistline.

The process by which the garments are scanned and loaded onto the sorting conveyor 18 is preferably the same as shown and described in co-pending U.S. patent application Ser. No. 07/643,780 entitled "Computer Control System and Method For Scanning and Loading Articles On A Conveyor", filed on even date herewith, which is assigned to the same assignee as is the present invention, and is hereby expressly incorporated by reference herein.

The second conveyor 16 is adapted to rotate the hangers H from one position into another, so that the scanners 22 or 24 can scan the coded labels 25. In the example illustrated in FIG. 1, the hangers H are rotated from a first position oriented at an angle relative to the axis of the second conveyor 16, into a second position oriented substantially parallel to the axis of the second conveyor 16. Thus, in the second position, the hangers H are oriented so that when the garments pass the scanners 22 and 24, each coded label 25 is facing a respective scanner. The first scanner 22 is positioned relative to the second conveyor 16 so that it can scan the coded labels attached to the collars of garments. The second scanner 24, on the other hand, is located below the first scanner 22 and, thus, is positioned to scan the coded labels 25 attached to the waistlines of garments. As described above, the coded labels 25 are coded with identifying information, such as the customer, the employee of the customer to whom the garment belongs, and the driver responsible for delivering that garment to the customer.

The first scanner 22 and second scanner 24 are each coupled to a computer 26, as shown in FIGS. 1 and 7. The computer 26 is coupled to a terminal 28, which includes both a display and a keyboard, as shown in FIG. 1. Thus, the scanners 22 and 24 are each adapted to scan the coded labels 25 and transmit output signals to the computer 26 indicative of the identifying information coded on each respective label.

As shown in FIG. 1, the computer 26 is also coupled to the motor 19 and each drop-off station 20 of the sorting conveyor 18. The computer 26 is adapted to store the output signals transmitted by the scanners 22 and 24 and, in turn, subsequently sort the garments once they are loaded onto the sorting conveyor 18. The process by which the sorting of the garments occurs, is preferably the same as shown and described in co-pending U.S. patent application Ser. No. 07/643,777 entitled "Computer Control System and Method For Sorting Articles On A Conveyor", filed on even date herewith, which is assigned to the same assignee as is the present invention, and is hereby expressly incorporated by reference herein.

Figure 2:
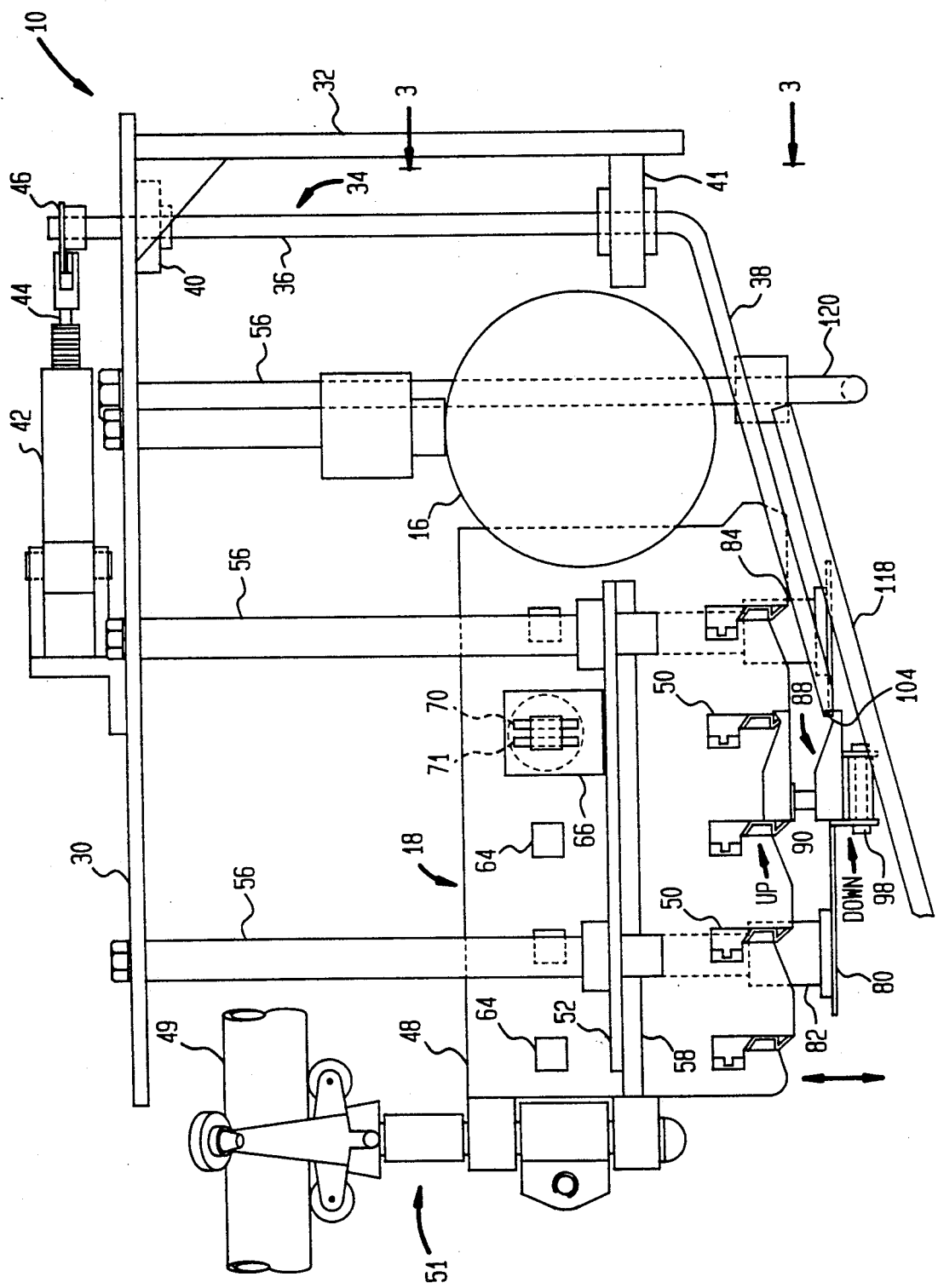
FIG. 2 is a partial plan view of the apparatus of FIG. 1, taken along the line 2—2 of FIG. 1.

Turning to FIG. 2, the apparatus 10 further comprises a support plate 30, which is suspended from the ceiling (not shown) of the dry cleaning or laundry facility. It should be pointed out, however, that the support plate 30 can equally be supported from another structure mounted, for example, on a floor or wall. A beam plate 32 is coupled on one end to the support plate 30 and projects downwardly in a plane substantially perpendicular to the plane of the support plate. A feed rod 34 includes a drive portion 36 and a feed portion 38 on its free end. The drive portion 36 is rotatably mounted on one end to the support plate 30 by a flanged bearing 40. The other end of the drive portion 36 is mounted to the beam plate 32 by a ball bearing pillow block 41. The ball bearing pillow block 41 is not shown in FIG. 3 for purposes of clarity in the illustration.

Figure 3:
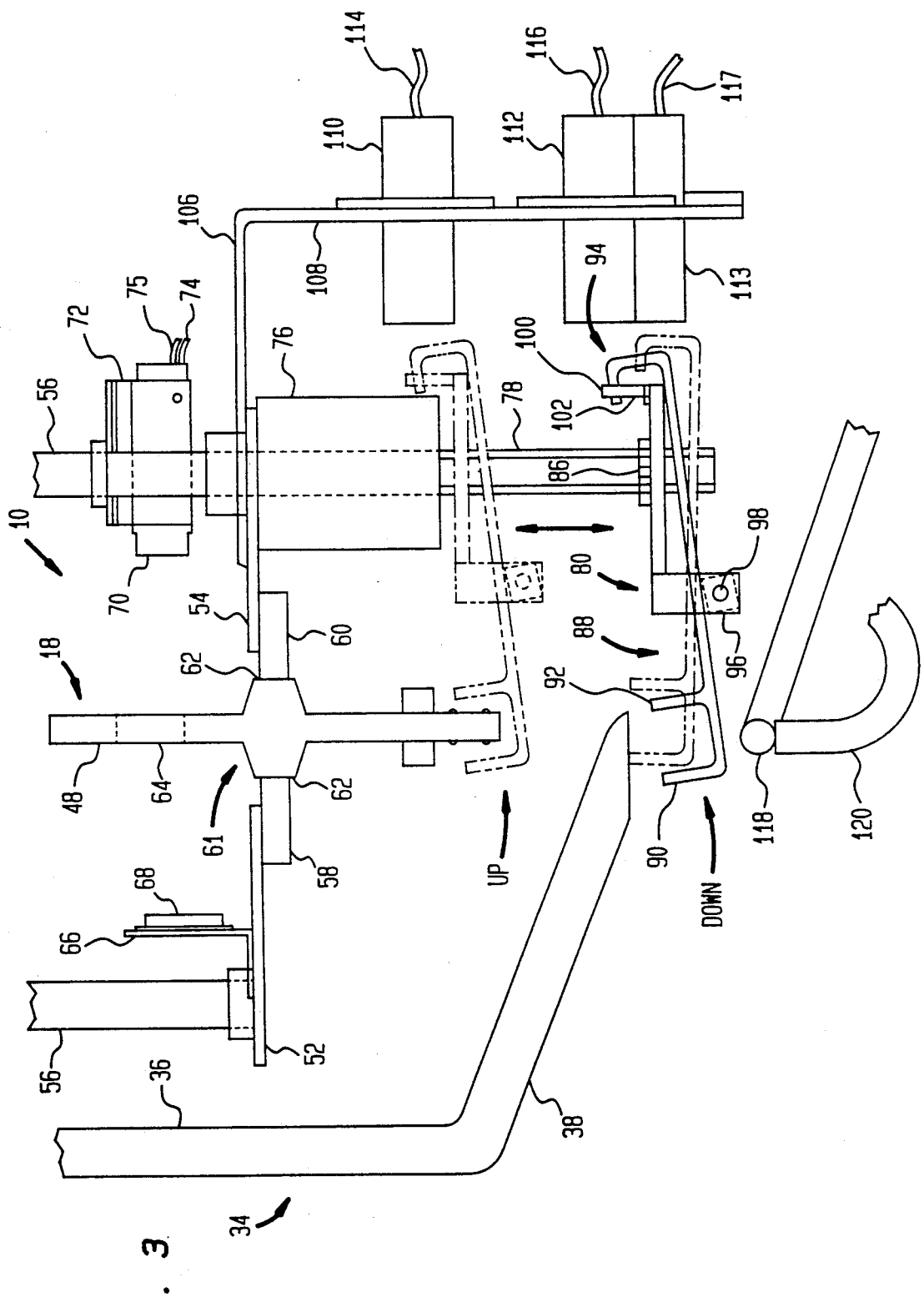
FIG. 3 is a partial plan view of the apparatus of FIG. 1, taken along the line 3—3 of FIG. 2.

A feed rod cylinder 42 is mounted on top of the support plate 30, as shown in FIG. 2. The feed rod cylinder 42 is of a type known to those of ordinary skill in the art, such as Model No. BRT-04, manufactured by Bimba, of Illinois. The feed rod cylinder 42 includes a spring biased piston 44, which is driven in response to the flow of pneumatic fluid within the cylinder, as is described further below. A crank 46 is secured to the free end of the drive portion 36 of the feed rod 34. The crank 46 is also coupled to the free end of the piston 44 of the feed rod cylinder 42. Thus, actuation of the feed rod cylinder 42 rotates the feed rod 34. The feed portion 38 of the feed rod 34 is therefore adapted to swing toward the sorting conveyor 18 into a load position, as shown in FIGS. 2 and 3, or away from the sorting conveyor 18 into a non-load position.

When the feed portion 38 is in the load position, it is located immediately below the free end of the second conveyor 16, as shown in FIG. 2. The feed portion 38 is then positioned to receive the hooked ends of the hangers H released from the second conveyor 16. As shown in FIGS. 2 and 3, the feed portion 38 is inclined at an angle greater than 90° downwardly relative to the drive portion 36. When a hanger H is released from the second conveyor 16 onto the feed portion 38, the hanger H slides down toward the free end of the feed portion and is in turn loaded onto the sorting conveyor 18, as is described further below. Once a sorting operation begins, however, the feed rod cylinder 42 is operated to swing the feed portion 38 away from the sorting conveyor 18 into the non-load position. In the non-load position, the feed portion 38 is prevented from interfering with the conveyance of the garments on the sorting conveyor 18.

The sorting conveyor 18 includes a plurality of carrier links 48 (only one shown in FIG. 2), which are coupled to each other in an end-to-end fashion in a manner known to those of ordinary skill in the art. The carrier links 48 are preferably the same as that shown and described in co-pending U.S. patent application Ser. No. 07/643,411 entitled "Carrier Assembly", filed on even date herewith, which is assigned to the same assignee as is the present invention, and is hereby expressly incorporated by reference herein.

Each carrier link 48 includes several latches 50 spaced relative to each other and supported within the bottom portion of the carrier link. Each latch 50 is adapted to releasably support the hooked end of a respective hanger H. Each carrier link 48 is supported from a guide rail 49 by a yoke assembly 51. As shown in FIG. 2, the yoke assembly 51 is supported on the guide rail 49 by rollers adapted to permit the yoke assembly and, thus, the carrier link 48 to roll along the guide rail when driven by the motor 19.

As shown in FIG. 3, the apparatus 10 further comprises a first guide plate 52 located on one side of the carrier 48 and a second guide plate 54 located on the other side of the carrier 48. The first and second guide plates 52 and 54, respectively, are each coupled to one end of a respective support rod 56. The other end of each support rod 56 is coupled to the support plate 30, as shown in FIG. 2.

A first guide 58 is coupled to the underside of the first guide plate 52, and extends substantially along the length of the first guide plate. A second guide 60 is coupled to the underside of the second guide plate 54, and likewise extends substantially along the length of the second guide plate. As shown in FIG. 3, the first guide 58 and second guide 60 define a space 61 between them which is adapted to permit the carriers 48 of the sorting conveyor 18 to pass therethrough.

Each carrier 48 includes a bumper portion 62 extending along either side of the carrier. Each bumper portion 62 is adapted to contact either the first guide 58 or the second guide 60, respectively, as shown in FIG. 3. The first guide 58 and second guide 60 are preferably made of a synthetic material having a low coefficient of friction, such as a phenolic resin laminate. Thus, the first and second guides 58 and 60, respectively, maintain each carrier 48 in a substantially vertically oriented position, yet permit the carriers 48 to pass through the space 61 upon movement of the conveyor 18.

Each carrier 48 further includes several square apertures 64 equally spaced apart from each other and extending through the carrier. Each aperture 64 corresponds in position to a respective latch 50, as shown in FIG. 2. A reflector bracket 66 extends upwardly from the top surface of the first guide plate 52. The reflector bracket 66 includes a retroreflective target 68 mounted on the side of the bracket facing the carrier 48. As shown in FIG. 3, the retroreflective target 68 is positioned so that it is located in line with each respective aperture 64 as the sorting conveyor 18 is moved in front of the target.

The apparatus 10 further includes two optical sensors 70 and 71 adapted to sense the position of the conveyor 18, as illustrated in dashed lines in FIG. 2. The optical sensors 70 and 71 are supported by a bracket 72 from the support rod 56 located on the side of the carrier 48 opposite the retroreflective target 68, as shown in FIG. 3. As shown in FIG. 2, the optical sensors 70 and 71 are located in line with the retroreflective target 68. The optical sensors 70 and 71 are each adapted to generate output signals in response to sensing the presence of the retroreflective target 68.

Thus, when the carrier 48 is conveyed forward between the retroreflective target 68 and sensors 70 and 71, each sensor generates an output signal in response to each aperture 64 passing between the respective sensor and the target 68. The sensors 70 and 71 each continuously generate an output signal so long as an aperture 64 is located between the target 68 and the respective sensor. Then, once the rear edge of the aperture 64 passes the target 68, neither sensor can sense the presence of the target and, thus, both sensors cease to generate output signals.

Figure 6:
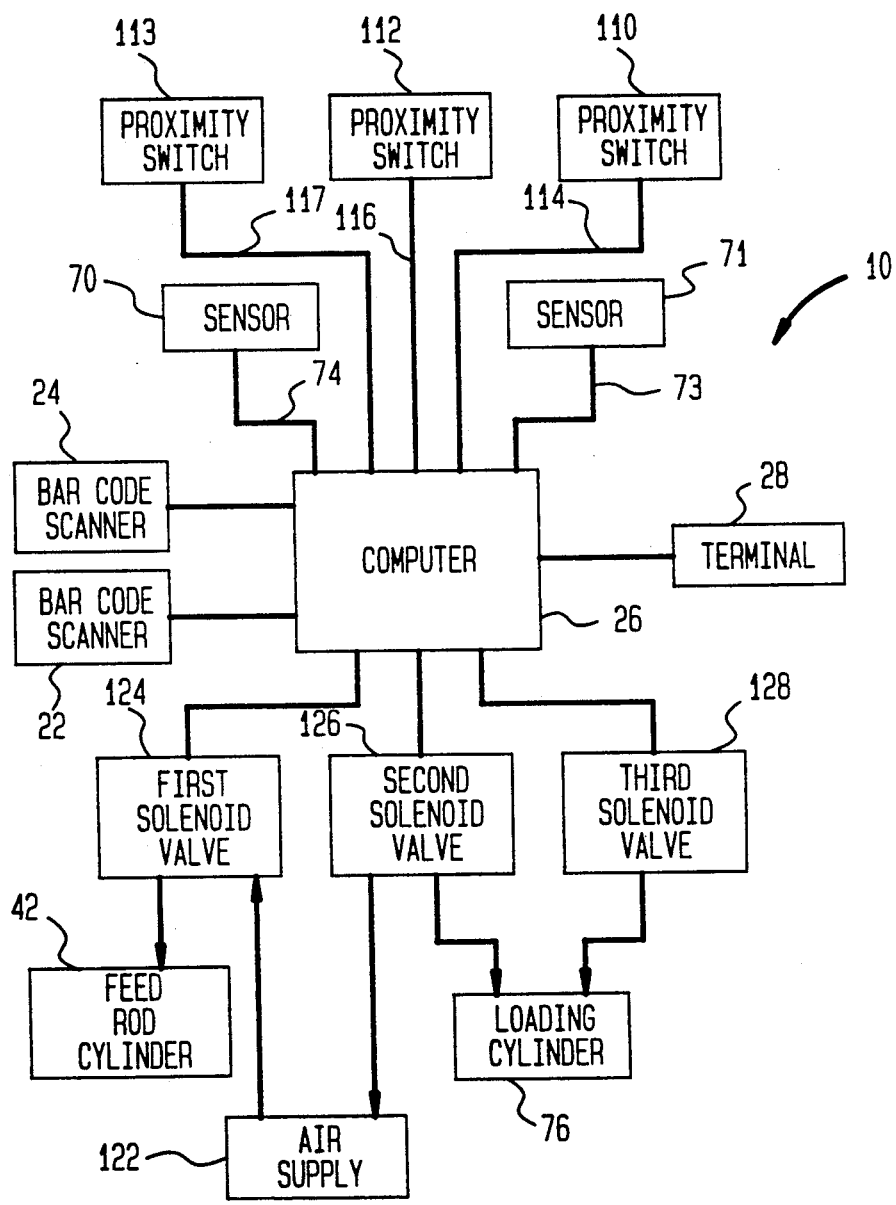
FIG. 6 is a schematic illustration of the control components of the apparatus of FIG. 1.

The sensors 70 and 71 are coupled by cables 74 and 75, respectively, to the computer 26, as shown in FIG. 6. The computer 26 is in turn adapted to control the other components of the apparatus 10 in response to the output signals transmitted by the sensors 70 and 71, as is described further below. The computer 26 is also adapted to determine the direction of travel and speed of the conveyor 18. Depending upon which sensor, 70 or 71, first transmits an output signal, the computer 26 can determine the direction of travel of the conveyor 18. Likewise, based upon the difference in time between the signals transmitted by the sensors 70 and 71, and the width of the aperture 64, the computer 26 can determine the travel speed of the conveyor 18. The retroreflective target 68 and sensors 70 and 71 are of a type known to those of ordinary skill in the art, such as the type 42SRU Series 6200 Polarized Beam Reflex control, manufactured by the Allen-Bradley Co., Photoswitch Div., of Waltham, Mass.

The apparatus 10 further comprises a loading cylinder 76 supported from the underside of the second guide plate 54, as shown in FIG. 3. The loading cylinder 76 includes a loading piston 78, which is adapted to be driven in response to the flow of pneumatic fluid within the cylinder 76. The loading cylinder 76 is of a type known to those of ordinary skill in the art, such as the Flat-1 series cylinder, manufactured by Bimba, of Illinois.

The apparatus 10 further comprises a loader base plate 80. The base plate 80 is supported on one end from a support rod 56 by a first linear ball bearing 82, as shown in FIG. 2. The other end of the base plate 80 is supported from another support rod 56 by a second linear ball bearing 84. The linear ball bearings 82 and 84 (not shown in FIG. 3) are each coupled to the ends of the respective support rods 56, and are adapted to slide vertically on the support rods, as indicated by the arrow in FIG. 2.

Figure 4:
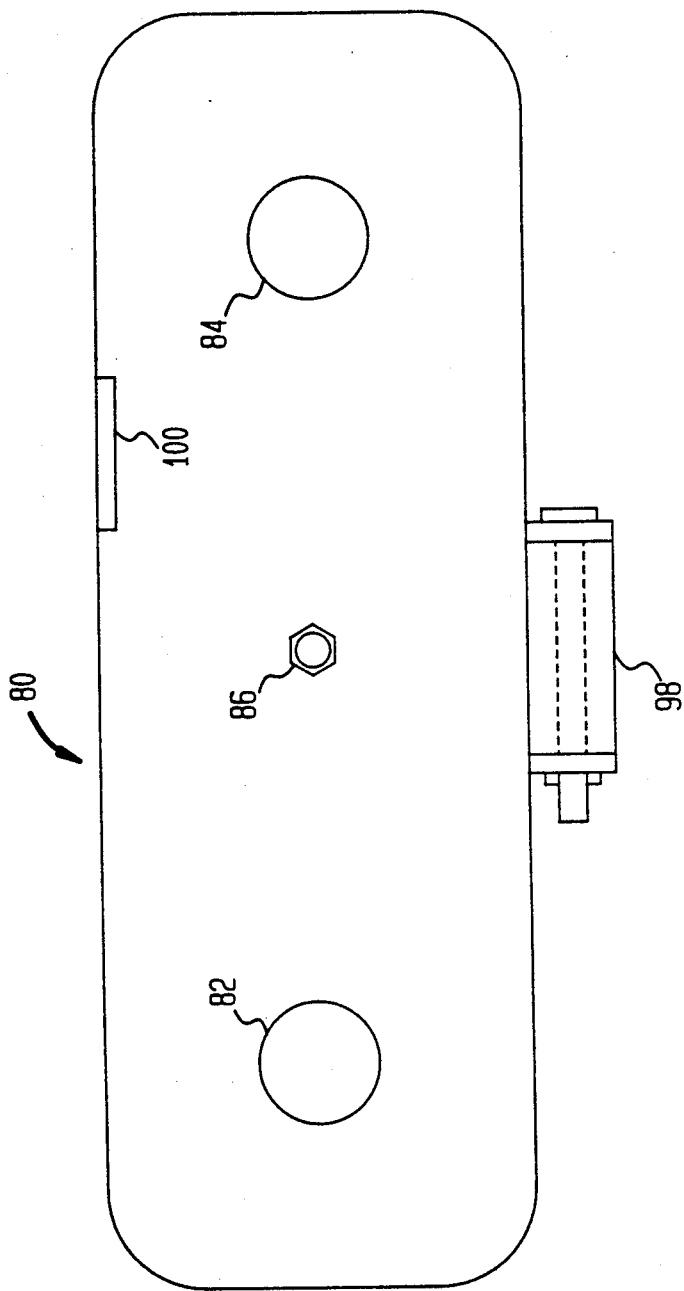
FIG. 4 is a top plan view of the loader base plate of the apparatus of FIG. 1.

The loader base plate 80 is illustrated in further detail in FIG. 4, and further includes a flange 86 located about mid-way between the first linear ball bearing 82 and the second linear ball bearing 84. The flange 86 is coupled to the free end of the loading piston 78, as shown in FIG. 3. Thus, the loader base plate 80 is adapted to be driven between an "up" position and a "down" position along the support rods 56 in response to actuation of the loading cylinder 76, as shown in FIGS. 2 and 3.

Figure 5:
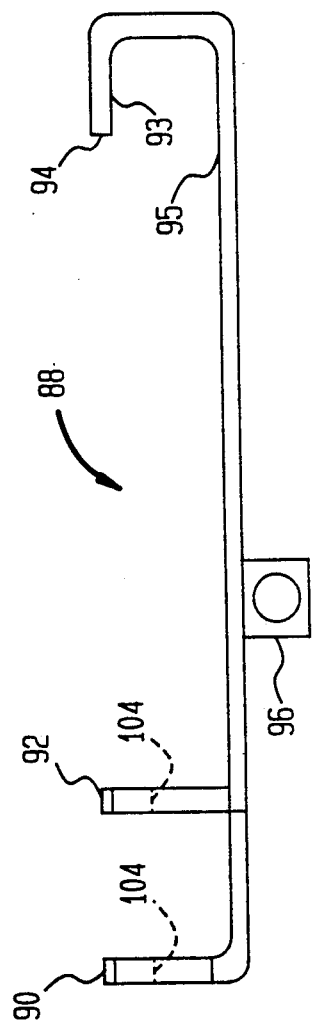
FIG. 5 is a side plan view of the loader fork of the apparatus of FIG. 1.

The apparatus 10 further comprises a load fork 88, which is adapted to receive the hooked ends of the hangers H from the feed rod 34 and, in turn, load each hanger H into a respective latch 50 of a carrier 48. The load fork 88 is illustrated in further detail in FIG. 5 and includes a first prong 90 projecting upwardly from one end. A second prong 92 is spaced inwardly from the first prong 90 and is oriented in a position substantially parallel with the first prong. A hooked portion 94 is formed on the end of the load fork 88 opposite the first prong 90. The hooked portion 94 defines a top inside face 93 and a bottom inside face 95. The load fork 88 also includes a lip 96 extending downwardly from its bottom surface.

The lip 96 is coupled to a pin 98 supported from the loader base plate 80 to pivotally support the load fork 88, as shown in FIGS. 2 and 3. The loader base plate 80 further includes another lip 100 projecting upwardly from the side opposite the pin 98, as shown in FIG. 4. Both the hooked portion 94 and the lip 100 are provided to be sensed by proximity switches to determine the position of the load fork 88 and the base plate 80, respectively, as is described further below.

The first prong 90 and second prong 92 of the load fork 88 each defines an indentation 104 in its top surface for receiving the hooked end of a hanger H, as shown in FIG. 2. The indentations 104 are located immediately below a respective latch 50 of the carrier 48, and below the free end of the feed portion 38 of the feed rod 34 when in the down position, as shown in FIG. 2. The indentations 104 are thus adapted to receive the hooked end of a hanger H sliding off the free end of the feed portion 38. The load fork 88 is in turn adapted to load the hanger H into the respective latch 50 located directly above, as is described further below.

As shown in FIG. 3, the load fork 88 is adapted to be pivoted on the pin 98 from a first position shown in broken lines, into a second position shown in solid lines, upon receiving the hooked end of a hanger H onto the first and second prongs 90 and 92, respectively. The hooked portion 94 is adapted to limit the pivotal rotation of the load fork 88 upon receiving a hanger H. In the first position (without a hanger H), the inside top surface 93 of the hooked portion 94 is maintained in contact with the base plate 80, as illustrated in broken lines in FIG. 3. In the second position (with a hanger H), on the other hand, the bottom surface 95 of the hooked portion 94 is rotated into contact with the base plate 80, as illustrated in solid lines in FIG. 3.

As also shown in FIG. 3, the space defined between the first prong 90 and second prong 92 is sufficient to permit the bottom portion of the carrier 48 to fit between the two prongs. A hanger H (not shown) seated on the first and second prongs 90 and 92, respectively, is therefore loaded into a respective latch 50, by driving the loading piston 78 from the down position, as indicated in solid lines in FIG. 3, into the up position, as indicated in broken lines in FIG. 3. Accordingly, when the load fork 88 is driven into the up position, the hooked end of the hanger H is, in turn, driven into the respective latch 50 and, thus, releasably supported by the latch.

The apparatus 10 further comprises an L-shaped support bracket 106 coupled on one end to the top surface of the second guide plate 54, as shown in FIG. 3. The L-shaped bracket 106 includes a mounting wall 108 projecting downwardly in a direction substantially parallel to the support rods 56 and spaced away from the load fork 88. A first proximity switch 110 is supported on the mounting wall 108. A second proximity switch 112 is also supported on the mounting wall 108 and spaced below the first proximity switch 110. And a third proximity switch 113 is supported on the mounting wall 108 below the second proximity switch 112, as shown in FIG. 3. The proximity switches 110, 112 and 113 are preferably inductive proximity switches of a type known to those of ordinary skill in the art, such as Model No. BES-516-326-S4-Y, manufactured by Balluff.

As shown in FIG. 3, the first proximity switch 110 is positioned in line with the lip 100 of the loader base plate 80 when driven into the up position. The second proximity switch 112, on the other hand, is positioned in line with the lip 100 when the loader base plate 80 is driven into the down position. The third proximity switch 113 is positioned in line with the hooked portion 94 of the load fork 88 when located in the down position and without a hanger H seated on the first and second prongs 90 and 92, respectively. The first proximity switch 110, second proximity switch 112, and third proximity switch 113 are coupled by cables 114, 116 and 117, respectively, to the computer 26, as shown in FIG. 6.

The first and second proximity switches 110 and 112, respectively, are each adapted to sense the presence of the lip 100 of the base plate 80 and, in turn, generate output signals indicative thereof. The first proximity switch 110 thus transmits output signals to the computer 26 in response to the loader base plate 80 being driven into the up position. And the second proximity switch 112 transmits output signals to the computer 26 in response to the loader base plate 80 being driven into the down position. The third proximity switch 113, on the other hand, is adapted to sense the presence of the hooked portion 94 of the load fork 88 and, in turn, generate output signals indicative thereof. The third proximity switch 113 thus transmits output signals to the computer 26 in response to the load fork 88 being driven into the down position without the hooked end of a hanger H seated on the first and second prongs (as illustrated in broken lines in FIG. 3).

The apparatus 10 further comprises a reject rail 118 located directly below the prongs 90 and 92 of the load fork 88. As shown in FIG. 2, the reject rail 118 is supported from one end of a support rod 56 by a hooked member 120. If the loader base plate 80 and, thus, the load fork 88 are located in the up position, a hanger H sliding off the free end of the feed portion 38 drops onto the reject rail 118. The reject rail 118 is therefore provided to receive hangers H which for some reason should not be loaded onto the sorting conveyor 18.

For example, if the scanners 22 or 24 fail to scan the label 25 on a garment, then the scanner that senses the presence of the label 25 transmits a no-read signal to the computer 26. The computer 26 in turn controls the loading cylinder 76 to maintain the load fork 88 in the up position. As a result, when the garment with the defective label 25 slides off the feed portion 38, it drops onto the reject rail 118. An operator can then remove the garment from the reject rail 118 and perform corrective action.

Turning to FIG. 6, the apparatus 10 further comprises an air supply 122. The air supply 122 is adapted to supply pressurized air to the pneumatic feed rod cylinder 42 and the pneumatic loading cylinder 76. A first solenoid valve 124 is coupled to the computer 26 and coupled between the air supply 122 and the feed rod cylinder 42. Thus, in response to a control signal transmitted by the computer 26, the first solenoid valve 124 is actuated to direct the flow of pressurized air from the air supply 122 to the feed rod cylinder 42, as indicated by the arrows in FIG. 6. The pressurized air flowing to the feed rod cylinder 42 causes the piston 44 to be driven outwardly and, in turn, drive the feed portion 38 of the feed rod 34 into the non-load position away from the sorting conveyor 18. As described above, the feed rod cylinder 42 is a spring biased type cylinder. Therefore, once the first solenoid valve 124 is deenergized and, thus, the air supply 122 is decoupled from the feed rod cylinder 42, the piston 44 is pulled back into the feed rod cylinder 42 by the spring biasing mechanism. As a result, the feed rod 34 is swung back into the load position, as shown in FIGS. 2 and 3.

A second solenoid valve 126 is coupled to the computer 26 and coupled between the air supply 122 and the loading cylinder 76, as shown in FIG. 6. A third solenoid valve 128 is also coupled to the computer 26 and coupled between the air supply 122 and the loading cylinder 76. The second solenoid valve 126 is actuated in response to a control signal transmitted by the computer 26 to direct the flow of pressurized air from the air supply 122 to the loading cylinder 76, as indicated by the arrow in FIG. 7. The pressurized air drives the loading piston 78 downwardly and, in turn, drives the loader base plate 80 and, thus, the load fork 88 into the down position. Once the second solenoid valve 126 is deenergized, the load fork 88 is maintained in the down position until activation of the third solenoid valve 128.

The load fork 88 is then driven into the up position by actuating the third solenoid valve 128 in response to a control signal transmitted by the computer 26. Energization of the third solenoid valve 128 directs the flow of pressurized air from the air supply 122 to the other side of the loading cylinder 76, as indicated by the arrow in FIG. 7. As a result, the loading piston 78 is driven back into the loading cylinder 76 and, thus, the loader base plate 80 and load fork 88 are driven into the up position. Once the third solenoid valve 128 is deenergized, the load fork 88 is maintained in the up position until the second solenoid valve 126 is actuated again. When both the second solenoid valve 126 and third solenoid valve 128 are deenergized, the load fork 88 can be manually adjusted into either the up or down positions. Manual adjustment may be necessary, for example, for servicing the apparatus 10 or for correcting a malfunction.

In the operation of the apparatus of the present invention, the hangers H are conveyed one after another to the apparatus 10. In the conveying system illustrated, the hangers H are conveyed from the transporting conveyor 12 downwardly onto the first conveyor 14, as indicated by the arrows in FIG. 1. The hangers H are then conveyed one after the other from the first conveyor 14 onto the second conveyor 16. The second conveyor 16 then rotates each hanger H from a first position oriented at an angle relative to the axis of the second conveyor, into a second position oriented substantially parallel to the axis of the second conveyor. Accordingly, when each hanger H is oriented in the second position, the first and second scanners 22 and 24, respectively, can scan the labels 25 attached to the garments.

Thus, either the first or second scanner 22 or 24, respectively, scans the label 25 on each garment passing in front of the scanner and, in turn, transmits signals indicative of the identifying information coded on the label to the computer 26. The computer 26 stores the identifying information for each garment. Then, once all of the garments are loaded onto the sorting conveyor 18, the computer 26 is used to sort the garments into the drop-off stations 20.

If, however, both the first and second scanners 22 and 24, respectively, fail to scan the coded label 25 on a garment, then the respective scanner which is unable to scan the label transmits a no-read signal to the computer 26. The computer 26 then transmits a control signal to the third solenoid valve 128 to energize the valve and, thus, cause the loading cylinder 76 to drive the loader base plate 80 and load fork 88 into the up position. The garment with the defective coded label 25 is then released by the second conveyor 16 onto the feed portion 38 of the feed rod 36 and, in turn, onto the reject rail 118. An operator can later collect the garment and any other rejected garments and perform the necessary corrective action.

The hangers H are therefore delivered one after the other by the second conveyor 16 onto the feed portion 38 of the feed rod 36. Before the first hanger H is delivered onto the feed rod 36, however, the computer 26 actuates the second solenoid valve 126 to drive the loader base plate 80 and load fork 88 into the down position in order to receive the first hanger H. Before a hanger H is loaded onto the first and second prongs 90 and 92, respectively, the hooked portion 94 of the load fork 88 is located in line with the third proximity switch 113, as shown in broken lines in FIG. 3. The third proximity switch 113 therefore transmits an output signal to the computer 26 as long as a hanger H is not seated on the load fork 88.

Then, the first hanger H delivered onto the feed rod 36 slides off the end of the feed portion 38 and into the indentations 104 in the first and second prongs 90 and 92, respectively, of the load fork 88. The weight of the hanger H (not shown) causes the load fork 88 to pivot about the pin 98 into the second position, as shown in solid lines in FIG. 3. At that point, the third proximity switch 113 no longer senses the presence of the load fork 88 and therefore ceases to transmit its output signal to the computer 26. The computer 26 responds by actuating the third solenoid valve 128 to cause the loading cylinder 76 to drive the load fork 88 into the up position, as indicated in broken lines in FIG. 3. The hooked end of the hanger H seated on the first and second prongs 90 and 92, respectively, is therefore driven up into a respective latch 50 and, in turn, supported by the latch.

Once the load fork 88 reaches the up position, the lip 100 of the loader base plate 80 is located in line with the first proximity switch 110, as indicated in broken lines in FIG. 3. The first proximity switch 110 then senses the presence of the lip 100 and, in turn, transmits an output signal indicative thereof to the computer 26. The computer 26 responds by actuating the second solenoid valve 126 to cause the loading cylinder 76 to drive the load fork 88 into the down position. The computer 26 then transmits a signal to the motor 19 of the sorting conveyor 18 to drive the conveyor forward. Once the next aperture 64 passes between the sensor 70 and the retroreflective target 68, the sensor 70 senses the presence of the target and, in turn, transmits signals indicative thereof to the computer 26. Then, once the aperture 64 passes between the sensor 71 and target 68, the sensor 71 likewise senses the presence of the target 68 and, in turn, transmits output signals to the computer 26. At this point, however, the latch 50 corresponding to the respective aperture 64 is located immediately above the first and second prongs 90 and 92, respectively, of the load fork 88. The computer 26 therefore responds to the signals transmitted by the sensor 71 to stop the motor 19 and, thus, maintain the conveyor 18 in position to receive the next hanger H.

The same loading procedure is then repeated by the apparatus 10 for each hanger H delivered by the second conveyor 16 onto the feed rod 34. Then, once all of the hangers H are loaded onto the sorting conveyor 18, the computer 26 actuates the first solenoid valve 124. As a result, the feed rod cylinder 42 swings the feed portion 38 of the feed rod 34 into the non-load position away from the sorting conveyor 18. The computer 26 then initiates the process of sorting each hanger H into a respective drop-off station 20.

One advantage of the apparatus of the present invention, is that it is adapted to quickly and reliably scan the coded labels on articles, such as garments, and, in turn, automatically load the articles one after another onto a conveyor. Thus, the apparatus of the present invention should prove to be significantly faster and more reliable than prior apparatus, particularly such apparatus which relied on operators to scan the labels on garments, enter the data into a computer by hand, and then load the garments by hand one at a time onto a sorting conveyor.

I claim:

1. An apparatus for loading hooked members for supporting articles onto a conveyor, comprising:
    a loading member supported adjacent to the conveyor and adapted to receive a hooked member;
    a drive member coupled to the loading member and adapted to drive the loading member between a first position and a second position;
    a first device for sensing the presence of the loading member in the first position with a hooked member received thereon and adapted to activate the drive member to drive the loading member into the second position from the first position.

2. An apparatus as defined in claim 1, wherein the drive member includes a first cylinder and a first piston driven within the first cylinder, and free end of the first piston being coupled to the loading member to drive the loading member to load a hooked member onto the conveyor.

3. An apparatus as defined in claim 1, further comprising:
    a feed member supported adjacent to the loading member and adapted to receive a hooked member and, in turn, direct the hooked member onto the loading member.

4. An apparatus as defined in claim 3, wherein the feed member is rotatably supported adjacent to the loading member and is adapted to be rotatably driven into a first position for directing a hooked member onto the loading member and into a second position away from the loading member to avoid interfering with the conveyor.

5. An apparatus as defined in claim 4, further comprising:
    a drive unit coupled to the feed member to rotatably drive the feed member between the first and second positions.

6. An apparatus as defined in claim 1, further comprising:
    a base plate supported adjacent to the conveyor and moveable relative to the conveyor, wherein the drive member is coupled to the base plate and the loading member is supported on the base plate, and the base plate and, thus, the loading member are driven by the drive member to load a hooked member onto the conveyor.

7. An apparatus as defined in claim 6, wherein the loading member is pivotally supported on the base plate and is adapted to be pivoted from one position into another upon receiving a hooked member.

8. An apparatus as defined in claim 1, further comprising:
    a control unit coupled to the drive member for actuating the drive member to drive the loading member to load a hooked member onto the conveyor.

9. An apparatus as defined in claim 1, further comprising:
    a second device coupled to the drive member, for sensing the presence of the loading member in the second position for loading a hooked member onto the conveyor and, for controlling the drive member to drive the loading member from the second position into the first position.

10. An apparatus as defined in claim 9, wherein the first device further includes means for sensing the presence of the loading member in the receiving position without a hooked member received thereon.

11. An apparatus as defined in claim 10, further comprising:
   a control unit coupled to the drive member and to the first and second devices and adapted to activate the drive member to drive the loading member from the first position into the second position when the first device indicates the presence of the loading member in the first position with a hooked member received thereon, and for activating the drive member to drive the loading member into the first position, when the second device indicates the presence of the loading member in the second position.

12. An apparatus as defined in claim 1, further comprising:
   means for decoding coded information on articles supported on hooked members and for generating signals indicative of the information; and
   a control unit coupled to the means for decoding for receiving the signals therefrom and coupled to the conveyor to control the operation thereof, the control unit being adapted to store the signals and to sort the garments loaded onto the conveyor based thereon.

13. An apparatus as defined in claim 12, further comprising:
   a feed conveyor supported adjacent to the loading member and adapted to convey hooked members to the loading member, wherein the means for decoding is supported adjacent to the feed conveyor and, thus, is adapted to decode the coded information on the articles conveyed on the feed conveyor.

14. An apparatus as defined in claim 13, further comprising:
   a feed member supported between the feed conveyor and the loading member, the feed member being adapted to receive hooked members from the feed conveyor and, in turn, transfer the hooked members to the loading member.

15. An apparatus as defined in claim 14, wherein the feed member is selectively positionable between a first position for directing a hooked member onto the loading member, and a second position for preventing interference with the conveyor.

16. An apparatus as defined in claim 15, further comprising:
   a drive unit coupled to the feed member to rotatably drive the feed member between the first position and the second position.

17. An apparatus as defined in claim 16, further comprising:
   a control unit coupled to the drive unit and to the conveyor to control the operation thereof; and
   means for decoding coded information on articles supported on hooked members and for transmitting signals indicative of the coded information to the control unit, the means for decoding being adapted to transmit a no-read signal to the control unit in response to sensing the passage of coded information which cannot be decoded, the control unit being responsive to the no-read signal to activate the drive unit to drive the loading member into the loading position to prevent the article from being delivered to the loading member.

18. An apparatus as defined in claim 17, further comprising:
   a reject member located below the loading member and adapted to receive the hooked member and respective article upon the means for decoding generating a no-read signal.

19. An apparatus as defined in claim 1, further comprising:
   means for sensing the position of the conveyor relative to the loading member and for generating output signals indicative thereof; and
   a control unit coupled to the conveyor for controlling the operation of the conveyor and to the means for sensing for receiving the output signals therefrom, the control unit being responsive to the output signals for operating the conveyor to position the conveyor relative to the loading member for receiving a hooked member therefrom.

20. An apparatus as defined in claim 19, wherein
   the conveyor includes a plurality of latch members supported thereon, each latch member being adapted to support a hooked member, and a plurality of apertures spaced apart from each other and extending through the conveyor, each aperture corresponding in position to a respective latch member; and
   the means for sensing includes a target supported on one side of the conveyor and located in line with each respective aperture upon the conveyor being moved in front thereof, and a sensor supported on the opposite side of the conveyor relative to the target, the sensor being adapted to sense the presence of the target upon a respective aperture passing between the sensor and the target and to transmit output signals to the control unit indicative thereof, the control unit being responsive to the output signals to control the conveyor to position a latch member corresponding to the respective aperture relative to the loading member based thereon.

21. An apparatus for loading hooked members onto a conveyor, comprising:
   a load member supported adjacent to the conveyor and adapted to receive a hooked member when located in a first receiving position and to be driven into a second loading position to load the hooked member onto the conveyor;
   a drive unit coupled to the load member and adapted to drive the load member between the receiving and loading positions;
   a first sensor device adapted to sense the presence of the load member in the receiving position with a hooked member received thereon and adapted to activate the drive member to drive the load member into the loading position.

22. An apparatus as defined in claim 21, further comprising:
   a control unit coupled to the first sensor device and to the drive unit and adapted to control the operation of the drive unit.

23. An apparatus according to claim 22, further comprising:
   a second sensor coupled to the control unit, the second sensor including means for sensing the presence of the load member in the receiving position without a hooked member received thereon.

24. An apparatus as defined in claim 23, wherein the load member is pivotally supported and, thus, adapted to be pivoted from one position into another in response to receiving a hooked member, and the second sensor is adapted to indicate the presence of the load member in the receiving position without a hooked member received thereon.

25. An apparatus as defined in claim 23, further comprising:
a feed member coupled to the first and second sensors, and supported between the feed conveyor and the loading member, the feed member being adapted to receive hooked members from the feed conveyor and, in turn, transfer the hooked members to the loading member, wherein the feed member is selectively positionable between a first position for directing a hooked member onto the loading member, and a second position for preventing interference with the conveyor, wherein the feed member is positioned in the first position when the second sensor indicates the presence of the load member in the receiving position without a hooked member received thereon, and wherein the feed member is positioned in the second position when the first sensor indicates the presence of the load member in the receiving position with a hooked member received thereon.

26. An apparatus as defined in claim 21, further comprising:
a loading position sensor coupled to the control unit and adapted to sense the presence of the load member in the loading position and wherein the control unit controls the drive unit to drive the load member into the receiving position when the loading position sensor indicates the presence of the load member in the loading position.

27. An apparatus as defined in claim 21, further comprising:
a conveyor position sensor coupled to the control unit and adapted to sense the position of the conveyor, the control unit being coupled to the conveyor to control the movement of the conveyor based on the indication of the position of the conveyor provided by the conveyor position sensor.

28. An apparatus as defined in claim 27, further comprising:
a target located on an opposite side of the conveyor relative to the conveyor position sensor, wherein the conveyor position sensor is adapted to sense the target and the control unit control the movement of the conveyor based on the position of the conveyor indicated by the conveyor position sensor.

29. An apparatus as defined in claim 28, wherein the conveyor includes a plurality of latch members spaced apart relative to each other and each adapted to support a hooked member.

30. An apparatus as defined in claim 29, wherein the conveyor further includes a plurality of apertures spaced apart from each other and extending through the conveyor, each aperture corresponding in position to a respective latch member, so that upon movement of the conveyor the apertures pass between the conveyor position sensor and the target and thus permit the conveyor position sensor to sense the target.

31. An apparatus as defined in claim 21, further comprising:
a scanning device coupled to the control unit and adapted to decode coded information on articles supported on the hooked members prior to the hooked members being delivered to the load member and, in turn, transmit signals to the control unit indicative of the information.

32. An apparatus as defined in claim 31, further comprising:
a loading conveyor supported adjacent to the scanning device and adapted to successively deliver the hooked members to the load member, the scanning device thus being adapted to decode coded information on articles prior to delivery to the load member.

33. An apparatus as defined in claim 32, further comprising:
a feed member coupled between the loading conveyor and the load member and adapted to successively deliver the hooked members from the loading conveyor to the load member.

34. An apparatus for loading hooked members supporting articles onto a conveyor, comprising:
a loading member supported adjacent to the conveyor and adapted to receive a hooked member in a non-load position and to be driven into a load position to load the hooked member onto the conveyor;
driving means for driving the loading member between the non-load position and load position;
control means for controlling the operation of the driving means for driving the loading member between the non-load position and the load position;
a first sensing device coupled to the control means and adapted to sense the presence of the loading member in the non-load position with a hooked member received thereon and to transmit a signal indicative thereof to the control means to control the driving means to drive the loading member into the load position.

35. An apparatus as defined in claim 34, wherein the first sensing device includes means for sensing the presence of the loading member in the non-load position without a hooked member received thereon and, wherein the first sensing device transmits signals indicative thereof to the control means, the control means being responsive to the signals from the first sensing device to control the control means to drive the loading member between the non-load position and the load position.

36. An apparatus as defined in claim 34, further comprising:
a second sensing device coupled to the control means and adapted to sense presence of the loading member in the load position and to transmit a signal indicative thereof to the control means, the second means being responsive to the signal to control the driving means to drive the loading member into the non-load position.

37. An apparatus as defined in claim 34, further comprising:
a fourth sensor coupled to the second means and adapted to transmit a signal thereto indicative of the position of the conveyor, the second means being coupled to the conveyor and responsive to the signal to control the movement of the conveyor based thereon.

38. An apparatus as defined in claim 34, further comprising:

a scanning device coupled to the second means and adapted to decode coded labels, each coded label being associated with a respective article supported on a hooked member and including information pertaining thereto, the scanning device being further adapted transmit signals to the second means indicative of the information coded on the labels.

* * * * *